United States Patent
Peuchert et al.

(10) Patent No.: US 6,671,026 B2
(45) Date of Patent: Dec. 30, 2003

(54) FLAT PANEL LIQUID-CRYSTAL DISPLAY SUCH AS FOR A LAPTOP COMPUTER

(75) Inventors: Ulrich Peuchert, Mainz (DE); Peter Brix, Mainz (DE)

(73) Assignee: Schott Glas, Mainz (DE)

( * ) Notice: Subject to any disclaimer, the term of this patent is extended or adjusted under 35 U.S.C. 154(b) by 213 days.

(21) Appl. No.: 09/758,946

(22) Filed: Jan. 11, 2001

(65) Prior Publication Data

US 2002/0013210 A1 Jan. 31, 2002

(30) Foreign Application Priority Data

Jan. 12, 2000  (DE) ......................................... 100 00 839

(51) Int. Cl.⁷ ........................ G02F 1/1333; C03C 3/091
(52) U.S. Cl. .......................................... 349/158; 501/66
(58) Field of Search ............................. 349/158; 501/66

(56) References Cited

U.S. PATENT DOCUMENTS

| | | | |
|---|---|---|---|
| 4,824,808 A | | 4/1989 | Dumbaugh, Jr. |
| 5,116,787 A | | 5/1992 | Dumbaugh, Jr. |
| 5,116,789 A | | 5/1992 | Dumbaugh, Jr. et al. |
| 5,374,595 A | | 12/1994 | Dumbaugh, Jr. et al. |
| 5,770,535 A | | 6/1998 | Brix et al. |
| 5,859,681 A | * | 1/1999 | VanderPloeg et al. ...... 349/120 |
| 5,908,703 A | | 6/1999 | Brix et al. |
| 6,060,168 A | * | 5/2000 | Kohli ......................... 428/428 |
| 6,137,048 A | * | 10/2000 | Wu et al. .................... 136/260 |
| 6,169,047 B1 | * | 1/2001 | Nishizawa et al. ........... 501/66 |
| 6,468,933 B1 | * | 10/2002 | Narita et al. .................. 501/56 |

FOREIGN PATENT DOCUMENTS

| | | |
|---|---|---|
| DE | 3730410 | 4/1988 |
| DE | 4213579 | 10/1992 |
| DE | 19601022 | 7/1997 |
| DE | 19601922 | 7/1997 |
| DE | 19603689 | 8/1997 |
| DE | 19617344 | 8/1997 |
| EP | 0341313 | 6/1993 |
| EP | 0672629 | 9/1995 |
| EP | 0714862 | 6/1996 |
| EP | 0953549 | 11/1999 |
| EP | 1070681 | 1/2001 |
| EP | 1078893 | 2/2001 |
| JP | 61132536 | 6/1986 |
| JP | 4160030 | 6/1992 |
| JP | 8295530 | 11/1996 |
| JP | 912333 | 1/1997 |
| JP | 948632 | 2/1997 |
| JP | 971192 | 4/1997 |
| JP | 9100135 | 4/1997 |
| JP | 9711919 | 4/1997 |
| JP | 9156953 | 6/1997 |
| JP | 9169538 | 6/1997 |
| JP | 9263421 | 10/1997 |
| JP | 1025132 | 1/1998 |
| JP | 1045422 | 2/1998 |
| JP | 1059741 | 3/1998 |
| JP | 1072237 | 3/1998 |
| JP | 10114538 | 5/1998 |
| JP | 10130034 | 5/1998 |
| JP | 10139467 | 5/1998 |
| JP | 10231139 | 9/1998 |
| JP | 10324526 | 12/1998 |
| JP | 1143350 | 2/1999 |
| JP | 1149520 | 2/1999 |
| WO | 9827019 | 6/1998 |

* cited by examiner

*Primary Examiner*—Robert H. Kim
*Assistant Examiner*—Andrew Schechter
(74) *Attorney, Agent, or Firm*—Nils H. Ljungman & Associates

(57) ABSTRACT

The invention relates to an alkali-free aluminoborosilicate glass having a coefficient of thermal expansion $\alpha_{20/300}$ of between $2.8 \cdot 10^{-6}$/K and $3.6 \cdot 10^{-6}$/K, which has the following composition (in % by weight, based on oxide): silicon dioxide ($SiO_2$) >58–65, boric oxide ($B_2O_3$) >6–11.5, aluminum oxide ($Al_2O_3$) >20–25, magnesium oxide (MgO) 4–<6.5, calcium oxide (CaO) >4.5–8, strontium oxide (SrO) 0–<4, barium oxide (BaO) 0.5–<5, with strontium oxide (SrO)+barium oxide (BaO)>3, zinc oxide (ZnO) 0–<2, and which is highly suitable for use as a substrate glass both in display technology and in thin-film photovoltaics.

20 Claims, No Drawings

FLAT PANEL LIQUID-CRYSTAL DISPLAY SUCH AS FOR A LAPTOP COMPUTER

CROSS-REFERENCE TO RELATED PATENT APPLICATIONS

This application is related to application Ser. No. 09/758,919, filed concurrently herewith on Jan. 11, 2001, having the title ALKALI-FREE ALUMINOBOROSILICATE GLASS, AND USES THEREOF, naming as inventors Dr. Ulrich PEUCHERT and Dr. Peter BRIX.

This application is also related to application Ser. No. 09/758,952, filed concurrently herewith on Jan. 11, 2001, having the title ALKALI-FREE ALUMINOBOROSILICATE GLASS, AND USES THEREOF, naming as inventors Dr. Ulrich PEUCHERT and Dr. Peter BRIX.

This application is further related to application Ser. No. 09/758,903, filed concurrently herewith on Jan. 21, 2001, having the title ALKALI-FREE ALUMINOBOROSILICATE GLASS, AND USES THEREOF, naming as inventors Dr. Ulrich PEUCHERT and Dr. Peter BRIX.

BACKGROUND OF THE INVENTION

1. Field of the Invention

The invention relates to an alkali-free aluminoborosilicate glass. The invention also relates to uses of this glass.

2. Background of the Invention

High requirements are made of glasses for applications as substrates in flat-panel liquid-crystal (or expressed differently: liquid crystal) display technology, for example in TN (twisted nematic)/STN (supertwisted nematic, or expressed differently: super twisted nematic) displays, active matrix liquid crystal displays (AMLCDs), thin-film transistors (TFTs) or plasma addressed liquid crystals (PALCs). Besides high thermal shock resistance and good resistance to the aggressive chemicals employed in the process for the production of flat-panel screens, the glasses should have high transparency over a broad spectral range (VIS, UV) and, in order to save weight, a low density. Use as substrate material for integrated semiconductor circuits, for example in TFT displays ("chip on glass") in addition requires thermal matching to the thin-film material silicon which is usually deposited on the glass substrate in the form of amorphous silicon (a-Si) at low temperatures of up to 300° C. The amorphous silicon is partially recrystallized by subsequent heat treatment at temperatures of about 600° C. Owing to the a-Si fractions, the resulting, partially crystalline poly-Si layer is characterized by a thermal expansion coefficient of $\alpha_{20/300} \equiv 3.7 \times 10^{-6}/K$. Depending on the a-Si/poly-Si ratio, the thermal expansion coefficient $\alpha_{20/300}$ may vary between $2.9 \times 10^{-6}/K$ and $4.2 \times 10^{-6}/K$. When substantially crystalline Si layers are generated by high temperature treatments above 700° C. or direct deposition by CVD processes, which is likewise desired in thin-film photovoltaics, a substrate is required which has a significantly reduced thermal expansion of $3.2 \times 10^{-6}/K$ or less.

In addition, applications in display and photovoltaics technology require the absence of alkali metal ions. Sodium oxide levels of less than 1000 ppm (parts per million) as a result of production can be tolerated in view of the generally "poisoning" action due to diffusion of $Na^+$ into the semiconductor layer.

It should be possible to produce suitable glasses economically on a large industrial scale in adequate quality (no bubbles, knots, inclusions), for example in a float plant or by drawing methods. In particular, the production of thin (<1 mm) streak-free substrates with low surface undulation by drawing methods requires high devitrification stability of the glasses. Compaction of the substrate during production, in particular in the case of TFT displays, which has a disadvantageous effect on the semiconductor microstructure, can be countered by establishing a suitable temperature-dependent viscosity characteristic line of the glass: with respect to thermal process and shape stability, it should have a sufficiently high glass transition temperature, i.e. $T_g > 700°$ C., while on the other hand not having excessively high melting and processing ($V_A$) temperature, i.e. a $V_A$ of $\leq 1350°$ C.

The requirements of glass substrates for LCD display technology or thin-film photovoltaics technology are also described in "Glass substrates for AMLCD applications: properties and implications" by J. C. Lapp, SPIE Proceedings, Vol. 3014, invited paper (1997), and in "Photovoltaik—Strom aus der Sonne" by J. Schmid, Verlag C. F. Müller, Heidelberg 1994, respectively.

The abovementioned requirement profile is fulfilled best by alkaline earth metal aluminoborosilicate glasses. However, the known display or solar cell substrate glasses described in the following publications still have disadvantages and do not meet the full list of requirements:

Numerous documents describe glasses having low MgO and/or CaO contents: Japanese Patent Application No. 9-169 538 A, Japanese Patent Application No. 4-160 030 A, Japanese Patent Application No. 9-100 135 A, European Patent Application No. 714 862 A1, European Patent Application No. 341 313 B1, U.S. Pat. No. 5,374,595, Japanese Patent Application No. 9-48632 A, Japanese Patent Application No. 8-295530 A, International Application No. 97/11919 and International Application No. 97/11920. These glasses, do not have the desired meltability, as is evident from very high temperatures at viscosities of $10^2$ dPas and $10^4$ dPas, and have a relatively high density. The same applies to the MgO-free glasses of DE 37 30 410 A1, U.S. Pat. No. 5,116,787 and U.S. Pat. No. 5,116,789.

On the other hand, glasses having high MgO contents, as described in Japanese Patent Application No. 61-123 536 A, are insufficient in terms of their chemical resistance and their devitrification and segregation behavior.

The glasses described in International Application No. 98/27019 contain very little BaO and SrO and are likewise susceptible to crystallization.

Glasses having a high content of the heavy alkaline earth metals BaO and/or SrO, as described in European Patent Application No. 341313 B1, have undesirably high densities and poor meltabilities. The same is true for the glasses of Japanese Patent Application No. 10-72237 A. According to the examples, the glasses have high temperatures at viscosities of $10^4$ dPas and $10^2$ dPas.

Glasses having low boric acid contents likewise exhibit excessively high melting temperatures or, as a result of this, excessively high viscosities at the melt and processing temperatures required for processes involving these glasses. This applies to the glasses of Japanese Patent Application No. 10-45422 A, Japanese Patent Application No. 9-263421 A and Japanese Patent Application No. 61-132536 A.

Moreover, glasses of this type have a high devitrification tendency when combined with low BaO contents.

In contrast, glasses having high boric acid contents, as described, for example, in U.S. Pat. No. 4,824,808, have insufficient heat resistance and chemical resistance, in particular to hydrochloric acid solutions.

Glasses having a relatively low $SiO_2$ content do not have sufficiently high chemical resistance either, in particular when they contain relatively large amounts of $B_2O_3$ and/or MgO and are low in alkaline earth metals. This applies to the glasses of International Application No. 97/11919 and European Patent Application No. 672 629 A2. The relatively $SiO_2$-rich variants of the latter document have only low $Al_2O_3$ levels, which is disadvantageous for the crystallization behavior.

The glasses described in Japanese Patent Application No. 9-12333 A for hard disks, are comparatively low in $Al_2O_3$ or $B_2O_3$, the latter merely being optional. The glasses have high alkaline earth metal oxide contents and have high thermal expansion, which makes them unsuitable for use in LCD or PV technology.

DE 42 13 579 A1 describes glasses for TFT applications having a coefficient of thermal expansion $\alpha_{20/300}$ of $<5.5 \times 10^{-6}$/K, according to the examples of $\geq 4.0 \times 10^{-6}$/K. These glasses which have relatively high $B_2O_3$ levels and relatively low $SiO_2$ contents do not have a high chemical resistance, in particular to diluted hydrochloric acid.

DE 196 01 022 A1 describes glasses which are selected from a very wide composition range and which must contain $ZrO_2$ and SnO. These low-$Al_2O_3$ glasses tend to exhibit glass defects because of their $ZrO_2$ level.

Federal Republic of Germany Patent No. 196 17 344 C1 (U.S. Pat. No. 5,908,703) and Federal Republic of Germany Patent No. 196 03 689 C1 (U.S. Pat. No. 5,770,535) by the Applicant disclose alkali-free, tin oxide-containing, low-$SiO_2$ or low-$Al_2O_3$ glasses having a coefficient of thermal expansion $\alpha_{20/300}$ of about $3.7 \cdot 10^{-6}$/K and very good chemical resistance. They are suitable for use in display technology. However, since they must contain ZnO, they are not ideal, in particular for processing in a float plant. In particular at higher ZnO contents (>1.5% by weight), there is a risk of formation of ZnO coatings on the glass surface by evaporation and subsequent condensation in the hot-shaping range.

JP 9-156 953 A also relates to alkali-free glasses for display technology which are low in $Al_2O_3$. The heat resistance of these glasses is insufficient, as is evident from the glass transition temperatures of the exemplary glasses.

In the unexamined Japanese publications Japanese Patent Application No. 10-25132 A, Japanese Patent Application No. 10-114538 A, Japanese Patent Application No. 10-130034 A, Japanese Patent Application No. 10-59741 A, Japanese Patent Application No. 10-324526 A, Japanese Patent Application No. 11-43350 A, Japanese Patent Application No. 10-139467 A, Japanese Patent Application No. 10-231139 A and Japanese Patent Application No. 11-49520 A, mention is made of very wide composition ranges for display glasses, which can be varied by means of many optional components and which are admixed with one or more specific refining agents in each case. However, these documents do not indicate how glasses having the complete requirement profile described above can be obtained in a specific manner.

OBJECT OF THE INVENTION

It is an object of the present invention to provide glasses which meet said physical and chemical requirements imposed on glass substrates for liquid-crystal displays, in particular for TFT displays, and for thin-film solar cells, in particular on the basis of $\mu c$-Si, glasses which have high heat resistance, a favorable processing range and sufficient devitrification stability.

SUMMARY OF THE INVENTION

The invention teaches that this object can be achieved by aluminoborosilicate glasses with the following composition (in % by weight, based on oxide): silicon dioxide ($SiO_2$)—from somewhat greater than 58% to 65% (>58%–65%); boric oxide ($B_2O_3$)—from somewhat greater than 6% to 11.5% (>6%–11.5%); aluminum oxide ($Al_2O_3$)—from somewhat greater than 20% to 25% (>20%–25%); magnesium oxide (MgO)—from 4% to somewhat less than 6.5% (4%–<6.5%); calcium oxide (CaO)—from somewhat greater than 4.5% to 8% (>4.5%–8%); strontium oxide (SrO)—from 0% to somewhat less than 4% (0%–<4%); barium oxide (BaO) from 0.5% to somewhat less than 5% (0.5%–<5%); with strontium oxide (SrO)+barium oxide (BaO)—to more than 3% (>3%); and zinc oxide (ZnO)—from 0% to 2%(0 %–2%).

The glass contains between >58 and 65% by weight of $SiO_2$. At lower contents, the chemical resistance is impaired, while at higher levels, the thermal expansion is too low and the crystallization tendency of the glass increases. Preference is given to a maximum content of 64.5% by weight.

The glass contains from >20 to 25% by weight of $Al_2O_3$. $Al_2O_3$ has a positive effect on the heat resistance of the glass without excessively increasing the processing temperature. At a low content, the glass becomes more susceptible to crystallization. Preference is given to a content of at least 20.5% by weight, in particular of at least 21% by weight, of $Al_2O_3$. Preference is given to a maximum $Al_2O_3$ content of 24% by weight.

The $B_2O_3$ content is restricted to a maximum of 11.5% by weight in order to achieve a high glass transition temperature $T_g$. Higher contents would also impair the chemical resistance. Preference is given to a maximum $B_2O_3$ content of 11% by weight. The $B_2O_3$ content is higher than 6% by weight to ensure that the glass has good meltability and good crystallization stability.

An essential glass component are the network-modifying alkaline earth metal oxides. In particular by varying their levels, a coefficient of thermal expansion $\alpha_{20/300}$ of between $2.8 \times 10^{-6}$/K and $3.6 \times 10^{-6}$/K is achieved. The individual oxides are present in the following proportions:

The glass contains from 4 to <6.5% by weight of MgO and from >4.5 to 8% by weight of CaO. Rather high levels of these two components have a positive effect on the desired properties of low density and low processing temperature, whereas rather low levels favor crystallization stability and chemical resistance.

The glass furthermore contains BaO, specifically at least 0.5% by weight. The maximum BaO content is limited to less than 5.0% by weight. This ensures good meltability and keeps the density low.

The glass may furthermore contain up to <4% by weight of the relatively heavy alkaline earth metal oxide SrO. Limitation of these optional components to this low maximum content is especially advantageous for a low density and good meltability of the glass. In order to improve the crystallization stability, it is preferred that SrO is present, specifically preferably in an amount of at least 0.2% by weight.

The total content of BaO and SrO is in this case >3% by weight in order to ensure sufficient crystallization stability.

The glass may contain up to 2% by weight of ZnO, preferably <2% by weight of ZnO. The network modifier ZnO has a structure-loosening function and has less effect on the thermal expansion than the alkaline earth metal oxides. Its effect on the viscosity characteristic line is similar to that of $B_2O_3$. In particular in the case of processing of the glass by the float process, the ZnO level is preferably limited to a maximum of 1.5% by weight. Higher levels would increase the risk of unwanted ZnO coatings on a glass surface which may form by evaporation and subsequent condensation in the hot-shaping range.

The glass is alkali-free. The term "alkali-free" as used herein means that it is essentially free from alkali metal oxides, although it can contain impurities of less than 1000 ppm (parts per million).

The glasses may contain up to 2% by weight of $ZrO_2$+$TiO_2$, where both the $TiO_2$ content and the $ZrO_2$ content can each be up to 2% by weight. $ZrO_2$ advantageously increases the heat resistance of the glass. Owing to its low solubility, $ZrO_2$ does, however, increase the risk of $ZrO_2$-containing melt relicts, so-called zirconium nests, in the glass. $ZrO_2$ is therefore preferably omitted. Low $ZrO_2$ contents originating from corrosion of zirconium-containing trough material are unproblematic. $TiO_2$ advantageously reduces the solarization tendency, i.e. the reduction in transmission in the visible wavelength region because of UV-VIS radiation. At contents of greater than 2% by weight, color casts can occur due to complex formation with $Fe^{3+}$ ions which are present in the glass at low levels as a result of impurities of the raw materials employed.

The glasses may contain conventional refining agents in the usual amounts: they may thus contain up to 1.5% by weight of $As_2O_3$, $Sb_2O_3$, $SnO_2$ and/or $CeO_2$. It is likewise possible to add 1.5% by weight each of $Cl^-$ (for example in the form of $BaCl_2$), $F^-$ (for example in the form of $CaF_2$) or $SO_4^{2-}$ (for example in the form of $BaSO_4$). The sum of $As_2O_3$, $Sb_2O_3$, $CeO_2$, $SnO_2$, $Cl^-$, $F^-$ and $SO_4^{2-}$ should, however, not exceed 1.5% by weight.

If the refining agents $As_2O_3$ and $Sb_2O_3$ are omitted, the glasses can be processed not only using the various drawing methods, but also by the float method.

For example with regard to easy batch preparation, it is advantageous to be able to omit both $ZrO_2$ and $SnO_2$ and still obtain glasses having the property profile mentioned above, in particular having high heat and chemical resistance and low crystallization tendency.

The above-discussed embodiments of the present invention will be described further hereinbelow. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

DESCRIPTION OF THE PREFERRED EMBODIMENT

The invention is further described with reference to examples, i.e. working examples, as follows. Working examples:

Glasses were produced in Pt/Ir crucibles at 1620° C. from conventional raw materials which were essentially alkali-free apart from unavoidable impurities. The melt was refined at this temperature for one and a half hours, then transferred into inductively heated platinum crucibles and stirred at 1550° C. for 30 minutes for homogenization.

The Table shows 11 examples of glasses according to the invention with their compositions (in % by weight, based on oxide) and their most important properties. The refining agent $SnO_2$ at a level of 0.3% by weight is not listed. The following properties are given:

the coefficient of thermal expansion $\alpha_{20/300}$ $[10^{-6}/K]$ the density $\rho$ $[g/cm^3]$ the dilatometric glass transition temperature $T_g$ [° C.] in accordance with DIN 52324 the temperature at a viscosity of $10^4$ dPas (referred to as T 4 [° C.])

the temperature at a viscosity of $10^2$ dPas (referred to as T 2 [° C.]), calculated from the Vogel-Fulcher-Tammann equation the refractive index $n_d$ the "HCl" acid resistance as weight loss (material removal value) from glass plates measuring 50 mm×50 mm×2 mm polished on all sides after treatment with 5% strength hydrochloric acid for 24 hours at 95° C. $[mg/cm^2]$ the resistance to buffered hydrofluoric acid ("BHF") as weight loss (material removal value) from glass plates measuring 50 mm×50 mm×2 mm and polished on all sides after treatment with 10% strength $NH_4F.HF$ solution for 20 minutes at 23° C. $[mg/cm^2]$.

TABLE

Examples: Compositions (in % by weight, based on oxide) and essential properties of glasses according to the invention.

| | 1 | 2 | 3 | 4 | 5 | 6 | 7 | 8 | 9 | 10 | 11 |
|---|---|---|---|---|---|---|---|---|---|---|---|
| $SiO_2$ | 59.0 | 58.5 | 58.5 | 60.0 | 58.5 | 60.7 | 59.5 | 59.3 | 58.3 | 58.5 | 58.2 |
| $B_2O_3$ | 7.0 | 6.5 | 6.5 | 6.6 | 8.1 | 6.5 | 7.5 | 6.1 | 6.1 | 6.5 | 7.2 |
| $Al_2O_3$ | 20.5 | 21.2 | 21.2 | 21.2 | 21.2 | 20.2 | 20.2 | 20.2 | 20.2 | 22.8 | 20.9 |
| MgO | 4.5 | 4.5 | 4.5 | 4.2 | 4.2 | 4.2 | 4.2 | 6.0 | 6.0 | 4.1 | 4.1 |
| CaO | 5.0 | 5.0 | 5.0 | 4.6 | 4.6 | 4.8 | 4.8 | 4.8 | 4.8 | 4.6 | 6.0 |
| SrO | 1.9 | 0.5 | 3.5 | 2.6 | 2.6 | 2.8 | 2.8 | 2.8 | 2.8 | 0.2 | 0.2 |
| BaO | 1.8 | 3.5 | 0.5 | 0.5 | 0.5 | 0.5 | 0.5 | 0.5 | 0.5 | 3.0 | 3.1 |
| ZnO | — | — | — | — | — | — | — | — | 1.0 | — | — |
| $\alpha_{20/300}$ $[10^{-6}/K]$ | 3.44 | 3.42 | 3.55 | 3.31 | 3.33 | 3.37 | 3.38 | 3.54 | 3.57 | 3.24 | 3.47 |
| $\rho$ $[g/cm^3]$ | 2.50 | 2.52 | 2.52 | 2.48 | 2.48 | 2.48 | 2.48 | 2.51 | 2.53 | 2.50 | 2.51 |
| $T_g$ [° C.] | 741 | 747 | 742 | 749 | 738 | 745 | 736 | 744 | 738 | 756 | 740 |
| T4 [° C.] | 1279 | 1285 | 1263 | 1293 | 1276 | 1292 | 1278 | 1271 | 1255 | 1298 | 1264 |
| T2 [° C.] | 1629 | 1632 | 1620 | 1648 | 1627 | 1650 | 1633 | 1617 | 1695 | 1647 | 1624 |
| $n_d$ | 1.526 | 1.528 | 1.528 | 1.524 | 1.524 | 1.523 | 1.523 | 1.529 | 1.531 | 1.526 | 1.528 |

TABLE-continued

Examples:
Compositions (in % by weight, based on oxide) and essential properties of glasses according to the invention.

| | 1 | 2 | 3 | 4 | 5 | 6 | 7 | 8 | 9 | 10 | 11 |
|---|---|---|---|---|---|---|---|---|---|---|---|
| HCl [mg/cm$^2$] | 0.88 | 0.76 | n.m. | n.m. | n.m. | 0.68 | n.m. | 0.67 | 0.66 | 0.94 | n.m. |
| BHF [mg/cm$^2$] | 0.66 | 0.65 | 0.73 | 0.67 | 0.67 | 0.65 | 0.66 | 0.74 | 0.77 | 0.64 | 0.62 | n. m. = not measured

As the working examples illustrate, the glasses according to the invention have the following advantageous properties:
a thermal expansion $\alpha_{20/300}$ of between $2.8\times10^{-6}$/K and $3.6\times10^{-6}$/K, thus matched to the expansion behavior of both amorphous silicon and increasingly polycrystalline silicon.
$T_g > 700°$ C., a very high glass transition temperature, i.e. a high heat resistance. This is essential for the lowest possible compaction as a result of production and for use of the glasses as substrates for coatings with amorphous Si layers and their subsequent annealing.
$\rho < 2.600$ g/cm$^3$, a low density
a temperature at a viscosity of $10^4$ dPas of at most 1350° C., and a temperature at a viscosity of $10^2$ dPas of at most 1720° C., which means a suitable viscosity characteristic line with regard to hot-shaping and meltability. The glasses can be produced as flat glasses by the various drawing methods, for example microsheet down-draw, up-draw or overflow fusion methods, and, in a preferred embodiment, if they are free from $As_2O_3$ and $Sb_2O_3$, also by the float process.
a high chemical resistance, as is evident from good resistance to hydrochloric acid and to buffered hydrofluoric acid solution, which makes them sufficiently inert to the chemicals used in the production of flat-panel screens.
$n_d \leq 1.531$, a low refractive index. This property is the physical prerequisite for a high transmission.

The glasses have high thermal shock resistance and good devitrification stability.

The glasses are thus highly suitable for use as substrate glass in display technology, in particular for TFT displays, and in thin-film photovoltaics.

Alkali-free aluminoborosilicate glass in accordance with the present invention may, for example, have any value of coefficient of thermal expansion $\alpha_{20/300}$ in the range of between about $2.8\times10^{-6}$/K and about $3.6\times10^{-6}$/K, for example, $2.9\times10^{-6}$/K and $3.5\times10^{-6}$/K. Thus, the value of the coefficient of thermal expansion $\alpha_{20/300}$ is not limited to the first and final values of the range, but can comprise any value of coefficient of thermal expansion $\alpha_{20/300}$ between them.

The alkali-free aluminoborosilicate glass in accordance with the present invention may, for example, have any value (in % by weight, based on oxide) of silica, silicon dioxide ($SiO_2$) in the range of from about 58 to about 65, for example, 59 and 64. Thus, the value for $SiO_2$, in % by weight, based on oxide, is not limited to the first and final values of the range, but can comprise any value of $SiO_2$ between them.

The alkali-free aluminoborosilicate glass in accordance with the present invention may, for example, have any value (in % by weight, based on oxide) of boric oxide ($B_2O_3$) in the range of from about 6 to about 11.5, for example, 6.5 and 11. Thus, the value for $B_2O_3$, in % by weight, based on oxide, is not limited to the first and final values of the range, but can comprise any value of $B_2O_3$ between them.

Similarly, the alkali-free aluminoborosilicate glass in accordance with the present invention may, for example, have any value (in % by weight, based on oxide) of alumina, aluminum oxide ($Al_2O_3$) in the range of from about 20 to about 25, for example, 19 and 24. Thus, the value for $Al_2O_3$, in % by weight, based on oxide, is not limited to the first and final values of the range, but can comprise any value of $Al_2O_3$ between them.

Thus, components of the composition of the alkali-free aluminoborosilicate glass in accordance with our invention are likewise not limited to the first and final values of the indicated range, but can comprise any value between them.

The expression "coefficient of thermal expansion $\alpha_{20/300}$" may indicate the fractional change in the length or volume of a body per degree of temperature change for the range of from 20 to 300 degrees Celsius.

The expression $\mu$c-Si is to mean in at least one embodiment of the invention: micro-crystalline silicon.

The expression thermal expansion coefficient or coefficient of thermal expansion ($\alpha_{20/300}$) in at least one embodiment of the invention is to mean: a nominal thermal coefficient ($\alpha$) as possibly applicable in the temperature range of from 20 to 300 in the Celsius scale, as possibly applicable in the context of the indicated data.

The expression glass transition temperature ($T_g$) in at least one embodiment of the invention is to mean: (1) the temperature below which a substance becomes superconducting; or (2) the temperature at which one polymorph changes into the next thermodynamically stable state; as the shown technical data suggest.

The density ($\rho$) is to mean in at least one embodiment of the invention: (1) the mass of a substance per unit of volume, expressed as kilograms per cubic meter, or expressed in smaller units, grams per cubic centimeter; or (2) the degree of opacity of a translucent material; as the technical data suggest.

The term DIN refers to the German Standard Organization "Deutsches Institute für Normung e.V., in Berlin, Germany, from which the numbered standards may be obtained.

The Vogel-Fulcher-Tammann equation is possibly related to the Fulcher equation meaning empirical in derivation; it relates glass viscosity to temperature: $\log\eta = -A + B/T - T_0$ where the temperature T is in degrees Celsius, A, B, and $T_0$ are material-specific constants.

One feature of the invention resides broadly in an Alkali-free aluminoborosilicate glass which has the following composition (in % by weight, based on oxide): $SiO_2 > 58-65$; $B_2O_3 > 6-11.5$; $Al_2O_3 > 20-25$; MgO $4-<6.5$; CaO$>4.5-8$; SrO $0-<4$; BaO $0.5-<5$; with SrO+BaO$>3$; and ZnO $0-2$.

Another feature of the invention resides broadly in an Aluminoborosilicate glass, characterized in that it comprises at least 20.5% by weight, preferably more than 21% by weight, of $Al_2O_3$.

Yet another feature of the invention resides broadly in an Aluminoborosilicate glass, characterized by the following composition (in % by weight, based on oxide): $ZrO_2$ 0–2; $TiO_2$ 0–2; with $ZrO_2+TiO_2$ 0–2; $As_2O_3$ 0–1.5; $Sb_2O_3$ 0–1.5; $SnO_2$ 0–1.5; $CeO_2$ 0–1.5; $Cl^-$ 0–1.5; $F^-$ 0–1.5; $SO_4^{2-}$ 0–1.5; and with $As_2O_3+Sb_2O_3+SnO_2+CeO_2+Cl^-+F^-+SO_4^{2-}$ 0–1.5.

Still another feature of the invention resides broadly in an aluminoborosilicate glass, characterized in that the glass is free of arsenic oxide and antimony oxide, apart from unavoidable impurities, and that it can be produced in a float-glass plant.

A further feature of the invention resides broadly in an aluminoborosilicate glass, which has a coefficient of thermal expansion $\alpha_{20/300}$ of $2.8\times10^{-6}/K$–$3.6\times10^{-6}/K$, a glass transition temperature $T_g$ of >700° C. and a density $\rho$ of <2.600 g/cm$^3$.

Another feature of the invention resides broadly in the use of the aluminoborosilicate glass as substrate glass in display technology.

Yet another feature of the invention resides broadly in the use of the aluminoborosilicate glass as substrate glass in thin-film photovoltaics.

The features disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 100 00 839.9-45, filed on Jan. 12, 2000, having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 836.4-45, filed on Jan. 12, 2000, [NHL-SCT-18] having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 838.0-45, filed on Jan. 12, 2000, [NHL-SCT-18] having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The corresponding foreign and international patent publication applications, namely, Federal Republic of Germany Patent Application No. 100 00 837.2-45, filed on Jan. 12, 2000, [NHL-SCT-21] having inventors Dr. Ulrich PEUCHERT and Dr. Peter BRIX, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein, are hereby incorporated by reference as if set forth in their entirety herein.

The U.S. Pat. No. 5,374,595 issued on Dec. 20, 1994 to William H. Dumbaugh, Jr., et al. and entitled "High liquidus viscosity glasses for flat panel displays", and its other equivalents or corresponding applications, if any, and the references cited in any of the documents cited therein, are hereby incorporated by reference as if set forth in their entirety herein.

The details in the patents, patent applications and publications may be considered to be incorporable, at Applicants' option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

Features of aluminoborosilicate glass, and the use thereof, which may possibly be incorporated in embodiments of the present invention may be found in U.S. Pat. No. 6,096,670 issued on Aug. 1, 2000 to Lautenschläger, et al. and entitled "Alkali metal-free aluminoborosilicate glass and its use"; U.S. Pat. No. 6,074,969 issued on Jun. 13, 2000 to Naumann, et al. and entitled "Earth-alkaline aluminoborosilicate glass for lamp bulbs"; U.S. Pat. No. 6,065,309 issued on May 23, 2000 to Cooper, et al. and entitled "Float processing of high-temperature complex silicate glasses and float baths used for same"; U.S. Pat. No. 6,013,310 issued on Jan. 11, 2000 to Yaoi, et al. and entitled "Method for producing a thin film semiconductor device"; U.S. Pat. No. 6,000,241 issued on Dec. 14, 1999 to Ranade, et al. and entitled "Process for making barium containing silicate glass powders"; U.S. Pat. No. 5,985,700 issued on Nov. 16, 1999 to Moore and entitled "TFT fabrication on leached glass surface"; U.S. Pat. No. 5,952,253 issued on Sep. 14, 1999 to Dejneka, et al. and entitled "Transparent apatite glass ceramics"; U.S. Pat. No. 5,932,326 issued on Aug. 3, 1999 to Kashima, et al. and entitled "Ceramic wiring boards and method for their manufacture"; U.S. Pat. No. 5,908,703 issued on Jun. 1, 1999 to Gaschler, et al. and entitled "Alkali-free aluminoborosilicate glass and its use" also referred to above; U.S. Pat No. 5,871,654 issued on Feb. 16, 1999 to Mannami, et al. and entitled "Method for producing a glass substrate for a magnetic disc"; U.S. Pat. No. 5,824,127 issued on Oct. 20, 1998 to Bange, et al. and entitled "Arsenic-free glasses"; U.S. Pat. No. 5,785,726 issued on Jul. 28, 1998 to Dorfeld, et al. and entitled "Method of reducing bubbles at the vessel/glass interface in a glass manufacturing system"; U.S. Pat. No. 5,770,535 issued on Jun. 23, 1998 to Brix, et al. and entitled "Alkali-free aluminoborosilicate glass and its use" also referred to above; U.S. Pat. No. 5,707,746 issued on Jan. 13, 1998 to Yaoi, et al. and entitled "Thin film transistor device with advanced characteristics by improved matching between a glass substrate and a silicon nitride layer"; U.S. Pat. No. 5,374,595 issued on Dec. 20, 1994 to Dumbaugh, Jr., et al and entitled "High liquidus viscosity glasses for flat panel displays", corresponding European Patent Application 0 607 865 A1 with date of publication of application: Jul. 27, 1994; U.S. Pat. No. 5,326,730 issued on Jul. 5, 1994 to Dumbaugh, Jr., et al. and entitled "Barium Aluminosilicate glasses"; U.S. Pat. No. 5,017,434 issued on May 21, 1991 to Enloe, et al. and entitled "Electronic package comprising aluminum nitride and aluminum nitride-borosilicate glass composite"; U.S. Pat. No. 4,940,674 issued on Jul. 10, 1990 to Beall, et al. and entitled "High strength haze-free transparent glass-ceramics"; U.S. Pat. No. 4,399,015 issued on Aug. 16, 1983 to Endo, et al. and entitled "Method for fabricating an indium tin oxide film for a transparent electrode"; U.S. Pat. No. 4,248,615 issued on Feb. 3, 1981 to Seng, et al. and entitled "Pollution abating, energy conserving glass manufacturing process"; U.S. Pat. No. 3,998,667 issued on Dec. 21, 1976 to Rapp and entitled "Barium aluminoborosilicate glass-ceramics for semiconductor doping"; U.S. Pat. No. 3,962,000 issued on Jun. 8, 1976 to Rapp and entitled "Barium aluminoborosilicate glass-ceramics for semiconductor doping"; U.S. Pat. No. 3,961,969 issued on Jun. 8, 1976 to Rapp and entitled "Glass-ceramics for semiconductor doping"; and U.S. Pat. No. 3,907,618 issued on Sep. 23, 1975 to Rapp and entitled "Process for doping semiconductor employing glass-ceramic dopant".

Examples of twisted nematic and/or super twisted nematic displays in which may possibly be incorporated embodiments of the present invention may be found in U.S. Pat. No. 6,023,317 issued on Feb. 8, 2000 to Xu, et al. and entitled "Normally white twisted nematic LCD with positive and negative retarders"; U.S. Pat. No. 5,859,681 issued on Jan. 12, 1999 to VanderPloeg, et al. and entitled "Normally white twisted nematic LCD with positive uniaxial and negative biaxial retarders having $N_x > N_y > N_z$"; U.S. Patent No. 5,818,615 issued on Oct. 6, 1998 to Abileah, et al. and entitled "Liquid crystal display with patterned retardation films"; U.S. Pat. No. 5,694,187 issued on Dec. 2, 1997 to Abileah, et al. and entitled "LCD including negative biaxial retarder on each side of the liquid crystal layer"; U.S. Pat. No. 5,657,140 issued on Aug. 12, 1997 to Xu, et al. and entitled "Normally white twisted nematic LCD with positive and negative retarders"; U.S. Pat. No. 5,576,855 issued on Nov. 19, 1996 to Swirbel, et al. and entitled "Liquid crystal display having embossed appearing characters"; and U.S. Pat. No. 3,975,286 issued on Aug. 17, 1976 to Oh and entitled "Low voltage actuated field effect liquid crystals compositions and method of synthesis".

Examples of active matrix liquid crystal displays (AMLCDs) in which may possibly be incorporated embodiments of the present invention may be found in U.S. Pat. No. 6,146,930 issued on Nov. 14, 2000 to Kobayashi, et al. and entitled "Method of fabricating and active-matrix liquid crystal display"; U.S. Pat. No. 6,140,990 issued on Oct. 31, 2000 to Schlig and entitled "Active matrix liquid crystal display incorporating pixel inversion with reduced drive pulse amplitudes"; U.S. Pat. No. 6,137,558 issued on Oct. 24, 2000 to Koma, et al. and entitled "Active-matrix liquid crystal display"; U.S. Pat. No. 6,091,473 issued on Jul. 18, 2000 to Hebiguchi and entitled "Active matrix liquid crystal display"; U.S. Pat. No. 6,075,580 issued on Jun. 13, 2000 to Kouchi and entitled "Active matrix type liquid crystal display apparatus with conductive light shield element"; U.S. Pat. No. 6,052,168 issued on Apr. 18, 2000 to Nishida, et al. and entitled "Active matrix liquid-crystal display with verticle alignment, positive anisotropy and opposing electrodes below pixel electrode"; U.S. Pat. No. 6,040,813 issued on Mar. 21, 2000 to Takubo and entitled "Active matrix liquid crystal display device and a method for driving the same"; U.S. Pat. No. 6,028,578 issued on Feb. 22, 2000 to Ota, et al. and entitled "Active matrix type liquid crystal display system and driving method therefor"; U.S. Pat. No. 5,990,998 issued on Nov. 23, 1999 to Park, et al. and entitled "Active matrix liquid crystal display and related method"; U.S. Pat. No. 5,880,794 issued on Mar. 9, 1999 to Hwang and entitled "Active matrix liquid crystal display and method with two anodizations"; U.S. Pat. No. 5,861,326 issued on Jan. 19, 1999 to Yamazaki, et al. and entitled "Method for manufacturing semiconductor integrated circuit"; U.S. Pat. No. 5,808,410 issued on Sep. 15, 1998 to Pinker, et al. and entitled "Flat panel light source for liquid crystal displays"; U.S. Pat. No. 5,767,930 issued to Kobayashi, et al. and entitled "Active-matrix liquid-crystal display and fabrication method thereof"; U.S. Pat. No. 5,739,180 issued on Apr. 14, 1998 to Taylor-Smith and entitled "Flat-panel displays and methods and substrates therefor"; U.S. Pat. No. 5,650,865 issued on Jul. 22, 1997 to Smith and entitled "Holographic backlight for flat panel displays"; U.S. Pat. No. Re 35,416 reissued on Dec. 31, 1996 to Suzuki, et al. and entitled "Active matrix liquid crystal display device and method for production thereof"; U.S. Pat. No. 5,546,204 issued on Aug. 13, 1996 to Ellis and entitled "TFT matrix liquid crystal device having data source lines and drain means of etched and doped single crystal silicon"; U.S. Pat. No. 5,493,986 issued on Feb. 27, 1996 to Augusto and entitled "Method of providing VLSI-quality crystalline semiconductor substrates; U.S. Pat. No. 5,465,052 issued on Nov. 7, 1995 to Henley and entitled "Method of testing liquid crystal display substrates"; U.S. Pat. No. 5,184,236 issued on Feb. 2, 1993 to Miyashita, et al. and entitled "Twisted nematic liquid crystal display device with retardation plates having phase axis direction with 15° of alignment direction"; U.S. Pat. No. 5,182,661 issued on Jan. 26, 1993 to Ikeda, et al. and entitled "Thin film field effect transistor array for use in active matrix liquid crystal display"; and U.S. Pat. No. 5,084,905 issued on Jan. 28, 1992 to Sasaki, et al. and entitled "Thin film transistor panel and manufacturing method thereof".

Examples of thin-film transistors (TFT) displays in which may possibly be incorporated embodiments of the present invention may be found in U.S. Pat. No. 6,087,678 issued on Jul. 11, 2000 to Kim and entitled "Thin-film transistor display devices having composite electrodes"; U.S. Pat. No. 6,005,646 issued on Dec. 21, 1999 to Nakamura, et al. and entitled "Voltage application driving method"; U.S. Pat. No. 5,920,362 issued on Jul. 6, 1999 to Lee and entitled "Method of forming thin-film transistor liquid crystal display having a silicon active layer contacting a sidewall of a data line and a storage capacitor electrode"; U.S. Pat. No. 5,920,083 issued on Jul. 6, 1999 to Bae and entitled "Thin-film transistor display devices having coplanar gate and drain lines"; U.S. Pat. No. 5,917,564 issued on Jun. 29, 1999 and entitled "Methods of forming active matrix display devices with reduced susceptibility to image-sticking and devices formed thereby"; U.S. Pat. No. 5,619,357 issued on Apr. 8, 1997 to Angelopoulos, et al. and entitled "Flat panel display containing black matrix polymer"; U.S. Pat. No. 5,317,433 issued on May 31, 1994 to Miyawaki, et al. and entitled "Image display device with a transistor on one side of insulating layer and liquid crystal on the other side"; U.S. Pat. No. 5,250,937 issued on Oct. 5, 1993 to Kikuo, et al. and entitled "Half tone liquid crystal display circuit with an A.C. voltage divider for drivers"; U.S. Pat. No. 5,233,448 issued on Aug. 3, 1993 to Wu and entitled "Method of manufacturing a liquid crystal display panel including photoconductive electrostatic protection"; U.S. Pat. No. 4,723,838 issued on Feb. 9, 1988 to Aoki, et al. and entitled "Liquid crystal display device"; and U.S. Pat. No. 4,404,578 issued on Sep. 13, 1983 to Takafuji, et al. and entitled "Structure of thin film transistors".

Examples of plasma addressed liquid crystals (PALCs) displays in which may possibly be incorporated embodiments of the present invention may be found in U.S. Pat. No. 6,094,183 issued on Jul. 25, 2000 to Tanamachi, et al. and entitled "Plasma addressed liquid crystal display device"; U.S. Pat. No. 6,081,245 issued on Jun. 27, 2000 to Abe and entitled "Plasma-addressed liquid-crystal display device"; U.S. Pat. No. 5,997,379 issued on Dec. 7, 1999 to Kimura and entitled "Method of manufacturing plasma addressed liquid crystal display"; U.S. Pat No. 5,984,747 issued on Nov. 16, 1999 to Bhagavatula, et al. and entitled "Glass structures for information displays"; U.S. Pat. No. 5,886,467 issued on Mar. 23, 1999 to Kimura and entitled "Plasma addressed liquid crystal display device"; U.S. Pat. No. 5,844,639 issued on Dec. 1, 1998 to Togawa and entitled "Plasma addressed liquid crystal display device"; U.S. Pat. No. 5,810,634 issued on Sep. 22, 1998 to Miyazaki, et al. and entitled "Method of manufacturing a plasma addressed liquid crystal display device"; U.S. Pat. No. 5,757,342 issued on May 26, 1998 to Hayashi and entitled "Plasma addressed liquid crystal display device"; U.S. Pat. No. 5,725,406 issued on Mar. 10, 1998 to Togawa and entitled "Plasma addressed display device"; U.S. Pat. No. 5,698,944 issued on Dec. 16, 1997 to Togawa and entitled "Plasma addressed liquid crystal display device"; U.S. Pat. No. 5,526,151 issued on Jun. 11, 1996 to Miyazaki, et al. and entitled "Method of manufacturing a plasma addressed liquid crystal display device having planarized barrier ribs"; U.S. Pat. No. 5,499,122 issued on Mar. 12, 1996 to Yano and entitled "Plasma-addressed liquid crystal display device having a transparent dielectric sheet with a porous layer containing an impregnated liquid crystal"; U.S. Pat. No. 5,383,040 issued on Jan. 17, 1995 to Kim and entitled "Plasma addressed liquid crystal display with center substrate divided into separate sections"; U.S. Pat. No. 5,377,029 issued on Dec. 27, 1994 to Lee, et al. and entitled "Plasma addressed liquid crystal display"; and U.S. Pat. No. 5,221,979 issued on Jun. 22, 1993 to Kim and entitled "Plasma addressed liquid crystal display and manufacturing method".

The details in the patents, patent applications and publications may be considered to be incorporable, at Applicants' option, into the claims during prosecution as further limitations in the claims to patentably distinguish any amended claims from any applied prior art Examples of thin-film photovoltaic apparatus and methods of making them in which may possibly be incorporated embodiments of the present invention may be found in U.S. Pat. No. 6,137,048 issued on Oct. 24, 2000 to Wu, et al. and entitled "Process for fabricating polycrystalline semiconductor thin-film solar cells, and cells produced thereby"; U.S. Pat. No. 5,922,142 issued on Jul. 13, 1999 to Wu, et al. and entitled "Photovoltaic devices comprising cadmium stannate transparent conducting films and method for making"; U.S. Pat. No. 5,503,898 issued on Apr. 2, 1996 to Lauf and entitled "Method for producing textured substrates for thin-film photovoltaic cells"; U.S. Pat. No. 5,378,639 issued on Jan. 3, 1995 to Sasaki, et al. and entitled "Method for manufacturing a thin-film photovoltaic conversion device"; U.S. Pat. No. 5,306,646 issued on Apr. 26, 1994 to Lauf and entitled "Method for producing textured substrates for thin-film photovoltaic cells"; U.S. Pat. No. 5,057,163 issued on Oct. 15, 1991 to Barnett, et al. and entitled "Deposited-silicon film solar cell"; U.S. Pat. No. 4,772,564 issued on Sep. 20, 1988 to Barnett, et al. and entitled "Fault tolerant thin-film photovoltaic cell fabrication Process"; U.S. Pat. No. 4,677,250 issued on Jun. 30, 1987 to Barnett, et al. and entitled "Fault tolerant thin-film photovoltaic cell"; U.S. Pat. No. 4,647,711 issued on Mar. 3, 1987 to Basol, et al. and entitled "Stable front contact current collectors for photovoltaic devices and method of making same"; U.S. Pat. No. 4,604,791 issued on Aug. 12, 1986 to Todorof and entitled "Method for producing multi-layer, thin-film, flexible silicon alloy photovoltaic cells"; and U.S. Pat. No. 4,595,790 issued on Jun. 17, 1986 to Basol and entitled "Method of making current collector grid and materials therefor".

Features of processing technology which may be incorporated in embodiments of the present invention may be found in U.S. Pat. No. 5,766,296 issued on Jun. 16, 1998 to Moreau and entitled "Furnace for melting glass and method for using glass produced therein"; U.S. Pat. No. 5,764,415 issued on Jun. 9, 1998 to Nelson, et al. and entitled "Coatings on glass"; U.S. Pat. No. 5,057,140 issued on Oct. 15, 1991 to Nixon and entitled "Apparatus for melting glass batch material"; U.S. Pat. No. 5,054,355 issued on Oct. 8, 1991 to Tisse, et al. and entitled "Automatic glass cutting and positioning system"; U.S. Pat No. 4,781,742 issued on Nov. 1, 1988 to Hill, et al. and entitled "Method and apparatus for detecting unwanted materials among cullet"; U.S. Pat. No. 4,489,870 issued on Dec. 25, 1984 to Prange, et al. and entitled "Apparatus for severing edges of a glass sheet"; and Re 30,147 reissued on Nov. 13, 1979 to Jordan, et al. and entitled "Method of coating a glass ribbon on a liquid float bath".

This invention as described hereinabove in the context of the preferred embodiments is not to be taken as limited to all of the provided details thereof, since modifications and variations thereof may be made without departing from the spirit and scope of the invention.

What is claimed is:

1. A flat panel liquid-crystal display, suitable for a laptop computer, the flat panel liquid-crystal display comprising one of: a twisted nematic display, a supertwisted nematic display, an active matrix liquid-crystal display, a thin film transistor display, and a plasma addressed liquid-crystal display, said flat panel liquid-crystal display comprising:

backlight apparatus;

a first linear polarizer adjacent said backlight apparatus;

a first positive uniaxial retardation film adjacent said first linear polarizer;

a first negative retardation film adjacent said first positive uniaxial retardation film;

a first orientation film adjacent said first negative retardation film;

a liquid-crystal layer adjacent said first orientation film;

a second orientation film adjacent said liquid-crystal layer;

a second negative retardation film adjacent said second orientation film;

a second positive uniaxial retardation film adjacent said second negative retardation film;

a second linear polarizer adjacent said second positive uniaxial retardation film;

a first glass substrate being disposed between said first orientation film and said first negative retardation film;

a second glass substrate being disposed between said second orientation film and said second negative retardation film;

a first electrode being disposed between said first glass substrate and said first orientation film; and a second electrode being disposed between said second glass substrate and said second orientation film said first and said second glass substrates comprising:
an alkali-free aluminoborosilicate glass;
said glass having a coefficient of thermal expansion $\alpha_{20/300}$ of between $2.8 \times 10^{-6}$/K and $3.6 \times 10^{-6}$/K;
said glass having the composition (in % by weight, based on oxide):

| | |
|---|---|
| $SiO_2$ | >58–65 |
| $B_2O_3$ | >6–11.5 |
| $Al_2O_3$ | >20–25 |
| MgO | 4–<6.5 |
| CaO | >4.5–8 |
| SrO | 0–<4 |
| BaO | 0.5–<5 |
| with SrO + BaO | >3 |
| ZnO | 0–<2; | said glass being resistant to thermal shock;
said glass having a high transparency over a broad spectral range in the visible and ultra violet ranges; and
said glass being free of bubbles, knots, inclusions, streaks, and surface undulations.

2. The flat panel liquid-crystal display according to claim 1, wherein:
said glass comprises at least one of (a.), (b.), (c.), (d.), and (e.), where (a.), (b.), (c.), (d.), and (e.) are:
(a.) one of: at least 20.5% by weight of $Al_2O_3$, and more than 21% by weight of $Al_2O_3$;
(b.) additionally (in % by weight):

| | |
|---|---|
| $ZrO_2$ | 0–2 |
| $TiO_2$ | 0–2 |
| with $ZrO_2$ + $TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3$ + $Sb_2O_3$ + $SnO_2$ + $CeO_2$ + $Cl^-$ + $F^-$ + $SO_4^{2-}$; | 0–1.5 |

(c.) both of (i.) and (ii.):
(i.) a temperature at a viscosity of $10^2$ dPas of at most 1720 degrees Celsius; and
(ii.) a processing temperature, $V_A$, at a viscosity of $10^4$ dPas of at most 1350 degrees Celsius;
(d.) a float glass; and
(e.) one of (i.), (ii.), and (iii.):
(i.) a coefficient of thermal expansion $\alpha_{20/300}$ of from $2.8 \times 10^{-6}$/K to $3.6 \times 10^{-6}$/K;
(ii.) a glass transition temperature $T_g$ of >700° C.; and
(iii.) a density ρ of <2.600 g/cm³.

3. The flat panel liquid-crystal display according to claim 1, wherein:
said glass comprises (a.), (b.), (c.), (d.), and (e.), where (a.), (b.), (c.), (d.), and (e.) are:
(a.) one of: at least 20.5% by weight of $Al_2O_3$, and more than 21% by weight of $Al_2O_3$;
(b.) additionally (in % by weight):

| | |
|---|---|
| $ZrO_2$ | 0–2 |
| $TiO_2$ | 0–2 |
| with $ZrO_2$ + $TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3$ + $Sb_2O_3$ + $SnO_2$ + $CeO_2$ + $Cl^-$ + $F^-$ + $SO_4^{2-}$; | 0–1.5 |

(c.) both of (i.) and (ii.):
(i.) a temperature at a viscosity of $10^2$ dPas of at most 1720 degrees Celsius; and
(ii.) a processing temperature, $V_A$, at a viscosity of $10^4$ dPas of at most 1350 degrees Celsius;
(d.) a float glass; and
(e.) one Of (i.), (ii.), and (iii.):
(i.) a coefficient of thermal expansion $\alpha_{20/300}$ of from $2.8 \times 10^{-6}$/K to $3.6 \times 10^{-6}$/K;
(ii.) a glass transition temperature $T_g$ of >700° C.; and
(iii.) a density ρ of <2.600 g/cm³.

4. A glass substrate for a flat panel liquid-crystal display, suitable for a laptop computer, the flat panel liquid-crystal display including a twisted nematic display, a supertwisted nematic display, an active matrix liquid-crystal display, a thin film transistor display, and a plasma addressed liquid-crystal display, said substrate comprising:

an alkali-free aluminoborosilicate glass;
said glass having a coefficient of thermal expansion $\alpha_{20/300}$ of between $2.8 \times 10^{-6}$/K and $3.6 \times 10^{-6}$/K;
said glass having the composition (in % by weight, based on oxide):

| | |
|---|---|
| $SiO_2$ | >58–65 |
| $B_2O_3$ | >6–11.5 |
| $Al_2O_3$ | >20–25 |
| MgO | 4–<6.5 |
| CaO | >4.5–8 |
| SrO | 0–<4 |
| BaO | 0.5–<5 |
| with SrO + BaO | >3 |
| ZnO | 0–<2; | said glass being resistant to thermal shock;
said glass having a high transparency over a broad spectral range in the visible and ultra violet ranges; and
said glass being free of bubbles, knots, inclusions, streaks, and surface undulations.

5. The glass substrate according to claim 4, wherein:
said glass comprises at least one of (a.), (b.), (c.), (d.), and (e.), where (a.), (b.), (c.), (d.), and (e.) are:
  (a.) one of: at least 20.5% by weight of $Al_2O_3$, and more than 21% by weight of $Al_2O_3$;
  (b.) additionally (in % by weight):

| | |
|---|---|
| $ZrO_2$ | 0–2 |
| $TiO_2$ | 0–2 |
| with $ZrO_2$ +$TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3 + Sb_2O_3 + SnO_2 + CeO_2 + Cl^- + F^- + SO_4^{2-}$; | 0–1.5 |

(C.) both of (i.) and (ii.):
    (i.) a temperature at a viscosity of $10^2$ dPas of at most 1720 degrees Celsius; and
    (ii.) a processing temperature, $V_A$, at a viscosity of $10^4$ dPas of at most 1350 degrees Celsius;
  (d.) a float glass; and
  (e.) one of (i.), (ii.), and (iii.):
    (i.) a coefficient of thermal expansion $\alpha_{20/300}$ of from $2.8 \times 10^{-6}$/K to $3.6 \times 10^{-6}$/K;
    (ii.) a glass transition temperature $T_g$ of >700° C.; and
    (iii.) a density $\rho$ of <2.600 g/cm³.

6. The glass substrate according to claim 4, wherein:
said glass comprises (a.), (b.), (C.), (d.), and (e.), where (a.), (b.), (c.), (d.), and (e.) are:
  (a.) one of: at least 20.5% by weight of $Al_2O_3$, and more than 21% by weight of $Al_2O_3$;

| | |
|---|---|
| $ZrO_2$ | 0–2 |
| $TiO_2$ | 0–2 |
| with $ZrO_2$ +$TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3 + Sb_2O_3 + SnO_2 + CeO_2 + Cl^- + F^- + SO_4^{2-}$; | 0–1.5 |

(c.) both of (i.) and (ii.):
    (i.) a temperature at a viscosity of $10^2$ dPas of at most 1720 degrees Celsius; and
    (ii.) a processing temperature, $V_A$, at a viscosity of $10^4$ dPas of at most 1350 degrees Celsius;
  (d.) a float glass; and
  (e.) one of (i.), (ii.), and (iii.):
    (i.) a coefficient of thermal expansion $\alpha_{20/300}$ of from $2.8 \times 10^{-6}$/K to $3.6 \times 10^{-6}$/K;
    (ii.) a glass transition temperature $T_g$ of >700° C.; and
    (iii.) a density $\rho$ of <2.600 g/cm³.

7. A glass comprising:
a substantially alkali-free aluminoborosilicate glass;
said glass having the composition (in % by weight, based on oxide):

| | |
|---|---|
| $SiO_2$ | >58–65 |
| $B_2O_3$ | >6–11.5 |
| $Al_2O_3$ | >20–25 |
| MgO | 4–<6.5 |
| CaO | >4.5–8 |
| SrO | 0–<4 |
| BaO | 0.5–<5 |
| with SrO + BaO | >3 |
| ZnO | 0–<2. |

8. The glass according to claim 7, wherein:
said glass is resistant to thermal shock;
said glass has a high transparency over a broad spectral range in the visible and ultra violet ranges; and
said glass is configured to be free of bubbles, knots, inclusions, streaks, and surface undulations.

9. The glass according to claim 8, wherein:
said glass comprises at least 20.5% by weight of $Al_2O_3$.

10. The glass according to claim 9, wherein:
said glass comprises more than 21% by weight of $Al_2O_3$.

11. The glass according to claim 10, wherein;
said glass additionally comprises (in % by weight):

| | |
|---|---|
| $ZrO_2$ | 0–2 |
| $TiO_2$ | 0–2 |
| with $ZrO_2$ +$TiO_2$ | 0–2 |
| $As_2O_3$ | 0–1.5 |
| $Sb_2O_3$ | 0–1.5 |
| $SnO_2$ | 0–1.5 |
| $CeO_2$ | 0–1.5 |
| $Cl^-$ | 0–1.5 |
| $F^-$ | 0–1.5 |
| $SO_4^{2-}$ | 0–1.5 |
| with $As_2O_3 + Sb_2O_3 + SnO_2 + CeO_2 + Cl^- + F^- + SO_4^{2-}$. | 0–1.5 |

12. The glass according to claim 11, wherein:
said glass comprises both of (i.) and (ii.):
  (i.) a temperature at a viscosity of $10^2$ dPas of at most 1720 degrees Celsius; and
  (ii.) a processing temperature, $V_A$, at a viscosity of $10^4$ dPas of at most 1350 degrees Celsius.

13. The glass according to claim 12, wherein:
said glass comprises a float glass.

14. The glass according to claim 13, wherein:
said glass comprises a coefficient of thermal expansion $\alpha_{20/300}$ of from $2.8 \times 10^{-6}$/K to $3.6 \times 10^{-6}$/K.

15. The glass according to claim 14, wherein:
said glass comprises a glass transition temperature $T_g$ of >700° C.

16. The glass according to claim 15, wherein:
said glass comprises a density $\rho$ of <2.600 g/cm³.

17. The glass according to claim 7, wherein:
said glass is configured as a glass substrate in combination in or with a flat panel liquid-crystal display, suitable for a laptop computer, the flat panel liquid-crustal display including a twisted nematic display, a supertwisted nematic display, an active matrix liquid-crystal display, a thin film transistor display, and a plasma addressed liquid-crystal display.

18. The glass according to claim 17, wherein:
said flat panel liquid-crystal display comprises:
- backlight apparatus;
- a first linear polarizer adjacent said backlight apparatus;
- a first positive uniaxial retardation film adjacent said first linear polarizer;
- a first negative retardation film adjacent said first positive uniaxial retardation film;
- a first, orientation film adjacent said first negative retardation film;
- a liquid-crystal layer adjacent said first orientation film;
- a second orientation film adjacent said liquid-crystal layer;
- a second negative retardation film adjacent said second orientation film;
- a second positive uniaxial retardation film adjacent said second negative retardation film;
- a second linear polarizer adjacent said second positive uniaxial retardation film;
- said glass substrate comprising a first glass substrate;
- said first glass substrate being disposed between said first orientation film and said first negative retardation film;
- said glass substrate comprising a second glass substrate;
- said second substrate being disposed between said second; orientation film and said second negative orientation film;
- a first electrode being disposed between said first glass substrate and said first orientation film; and
- a second electrode being disposed between said second glass substrate and said second orientation film.

19. The glass according to claim 7, wherein:
said glass is configured as a glass substrate in combination in or with a thin-film photovoltaic device, including a thin-film solar cell.

20. The glass according to claim 19, wherein, said thin-film photovoltaic device comprises:
- said glass substrate;
- a transparent conductive oxide film disposed on said glass substrate;
- an insulating buffer layer disposed atop said transparent conductive oxide film;
- said film being disposed between said glass substrate and said buffer layer and being configured to be a front contact current collector;
- a first semiconductor layer disposed upon said buffer layer;
- a second semiconductor layer disposed upon said first semiconductor layer to form a heterojunction;
- a first electrical contact disposed upon said second semiconductor layer and in ohmic contact therewith; and
- a second electrical contact disposed upon said transparent conductive oxide film.

* * * * *

UNITED STATES PATENT AND TRADEMARK OFFICE
CERTIFICATE OF CORRECTION

PATENT NO.    : 6,671,026 B2
DATED         : December 30, 2003
INVENTOR(S)   : Ulrich Peuchert and Peter Brix It is certified that error appears in the above-identified patent and that said Letters Patent is hereby corrected as shown below:

Column 1,
Line 49, before "3.7", delete "≡" and insert -- ≅ --.

Column 6,
Line 43, after "strength", delete "$NH_4F.HF$" and insert -- $NH_4F \bullet HF$ --.

Column 8,
Line 51, after "Institute", delete "fūr" and insert -- für --.

Column 9,
Line 61, after "2000," delete "[NHL-SCT-18]" and insert -- [NHL-SCT-19] --.

Column 15,
Line 13, after "film" insert -- ; --.

Column 16,
Line 32, after "(e.)one", delete "Of" and insert -- of --.

Column 17,
Line 21, before "both", delete "(C.)" and insert -- (c.) --.
Line 34, after "(b.),", delete "(C.)," and insert -- (c.), --.
Between line 37 and the table, insert the following:
-- (b.) additionally (in % by weight): --.

Column 19,
Line 9, after the first occurrence of "first" delete ",".

UNITED STATES PATENT AND TRADEMARK OFFICE
CERTIFICATE OF CORRECTION

PATENT NO.   : 6,671,026 B2
DATED         : December 30, 2003
INVENTOR(S)  : Ulrich Peuchert and Peter Brix It is certified that error appears in the above-identified patent and that said Letters Patent is hereby corrected as shown below:

<u>Column 19 (cont'd),</u>
Line 27, after the first occurrence of "second" delete ";".

Signed and Sealed this

Twentieth Day of April, 2004

JON W. DUDAS
*Acting Director of the United States Patent and Trademark Office*